US012699900B2

(12) United States Patent
Zou et al.

(10) Patent No.: US 12,699,900 B2
(45) Date of Patent: Aug. 4, 2026

(54) PATTERN-BASED CLASSIFICATION

(71) Applicant: Google LLC, Mountain View, CA (US)

(72) Inventors: Zhile Zou, Mountain View, CA (US); Chong Luo, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/966,652

(22) Filed: Dec. 3, 2024

(65) Prior Publication Data

US 2025/0165781 A1 May 22, 2025

Related U.S. Application Data

(63) Continuation of application No. 18/326,475, filed on May 31, 2023, now Pat. No. 12,190,244, which is a
(Continued)

(51) Int. Cl.
*G06N 3/08* (2023.01)
*G06F 16/28* (2019.01)
(Continued)

(52) U.S. Cl.
CPC ............. *G06N 3/08* (2013.01); *G06F 16/285* (2019.01); *G06F 21/10* (2013.01); *G06N 3/044* (2023.01)

(58) Field of Classification Search
CPC ...... G06F 16/285; G06F 21/10; G06F 21/552; G06N 3/044; G06N 3/0442; G06N 3/08; G06N 3/0895
See application file for complete search history.

(56) References Cited

U.S. PATENT DOCUMENTS 8,910,188 B1  12/2014 Wang et al.
10,789,553 B1 * 9/2020 Bhatwadekar ......... G06N 20/00
(Continued)

FOREIGN PATENT DOCUMENTS

CN  109074263  12/2008
CN  110795624  2/2020
(Continued)

OTHER PUBLICATIONS

Blog.acolyer.org [online], "MaMaDroid: Detecting Android malware by building Markov chains of behavorial models" Mar. 9, 2017, retrieved on Dec. 6, 2022, retrieved from URL <https://blog.acolyer.org/2017/03/09/mamadroid-detecting-android-malware-by-building-markov-chains-of-behavorial-models/>, 9 pages.
(Continued)

*Primary Examiner* — Etienne P Leroux
(74) *Attorney, Agent, or Firm* — Fish & Richardson P.C.

(57) ABSTRACT

A method includes receiving interaction data that indicates, for each given interaction among multiple interactions that occurred at a client device, (i) an event type an (ii) a delay period specifying an amount of time between the given event and a previous event that occurred prior to the given event, encoding each given interaction into an encoded interaction having a standardized format that is a combination of (i) the event type and (ii) the delay period, generating an interaction signature that includes sequence of encoded interactions, processing the sequence of encoded interactions using a model trained to label sequences of user interactions as valid or invalid, including labelling, using the model, a sequence of encoded interactions as invalid, and preventing distribution of a set of content to an entity that performed the sequence of encoded interactions in response to a subsequently identified request to provide content to the entity.

20 Claims, 5 Drawing Sheets

Related U.S. Application Data continuation of application No. 16/912,009, filed on Jun. 25, 2020, now Pat. No. 11,704,560.

(51) Int. Cl.
*G06F 21/10* (2013.01)
*G06N 3/044* (2023.01)

(56) References Cited

U.S. PATENT DOCUMENTS

| | | | | |
|---|---|---|---|---|
| 10,853,424 | B1 * | 12/2020 | Mandaviya | G06N 7/01 |
| 10,911,553 | B2 | 2/2021 | George et al. | |
| 11,704,560 | B2 | 7/2023 | Zou et al. | |
| 12,039,021 | B2 * | 7/2024 | Gelardi | H04W 12/68 |
| 2013/0067498 | A1 | 3/2013 | Heikes et al. | |
| 2016/0307210 | A1 | 10/2016 | Agarwal et al. | |
| 2017/0337804 | A1 * | 11/2017 | Yang | H04M 1/72454 |
| 2018/0191837 | A1 | 7/2018 | Christophe et al. | |
| 2018/0248902 | A1 | 8/2018 | Danila-Dumitrescu et al. | |
| 2018/0300609 | A1 | 10/2018 | Krishnamurthy et al. | |
| 2019/0012574 | A1 | 1/2019 | Anthony et al. | |
| 2019/0171542 | A1 * | 6/2019 | Lackner | G06F 11/3006 |
| 2019/0227975 | A1 | 7/2019 | Lund et al. | |
| 2019/0253443 | A1 * | 8/2019 | Vasudevan | H04L 67/12 |
| 2019/0364027 | A1 | 11/2019 | Pande et al. | |
| 2020/0045066 | A1 | 2/2020 | Meng et al. | |
| 2020/0084219 | A1 | 3/2020 | Sung et al. | |
| 2020/0218619 | A1 | 7/2020 | Hwang et al. | |
| 2020/0287839 | A1 * | 9/2020 | Cernoch | G06F 9/52 |
| 2021/0174389 | A1 | 6/2021 | Zamora et al. | |
| 2021/0200450 | A1 | 7/2021 | Lim et al. | |
| 2021/0311751 | A1 * | 10/2021 | Sheoran | G06N 3/08 |
| 2021/0327429 | A1 * | 10/2021 | Bromand | G06F 40/109 |
| 2023/0306263 | A1 * | 9/2023 | Zou | G06N 3/0442 |
| 2024/0193420 | A1 * | 6/2024 | Biswas | G06N 3/044 |

FOREIGN PATENT DOCUMENTS

| | | |
|---|---|---|
| JP | 2012-527691 | 11/2012 |
| JP | 2020-510926 | 4/2020 |
| KR | 10-2019-0087962 | 7/2019 |

OTHER PUBLICATIONS

International Preliminary Report on Patentability in International Appln. No. PCT/US2021/029693, mailed on Jan. 5, 2023, 8 pages.
International Search Report and Written Opinion in International Appln. No. PCT/US2021/029693, mailed on Jul. 6, 2021, 13 pages.
Notice of Allowance in Japanese Appln. No. 2022-554665, mailed on Aug. 5, 2024, 5 pages (with English translation).
Office Action in Canadian Appln. No. 3175105, mailed on Nov. 7, 2023, 4 pages.
Office Action in Chinese Appln. No. 202180019880.5, mailed on Nov. 14, 2023, 11 pages (with English translation).
Office Action in Japanese Appln. No. 2022-554665, mailed on Dec. 4, 2023, 11 pages (with English translation).
Office Action in Korean Appln. No. 10-2022-7030602, mailed on Aug. 13, 2024, 15 pages (with English translation).
Ratner, "Accelerating Machine Learning with Training Data Management" Thesis for the degree of Doctor of Philosophy, Stanford University, Aug. 2019, 238 pages.
Ye "A Markov Chain Model of Temporal Behavior for Anomaly Detection" Proceeding of the 2000 IEEE Workshop of Information and Assurance and Security, United States Military Academy, West Point, NY, Jun. 6-7, 2000, 4 pages.

* cited by examiner

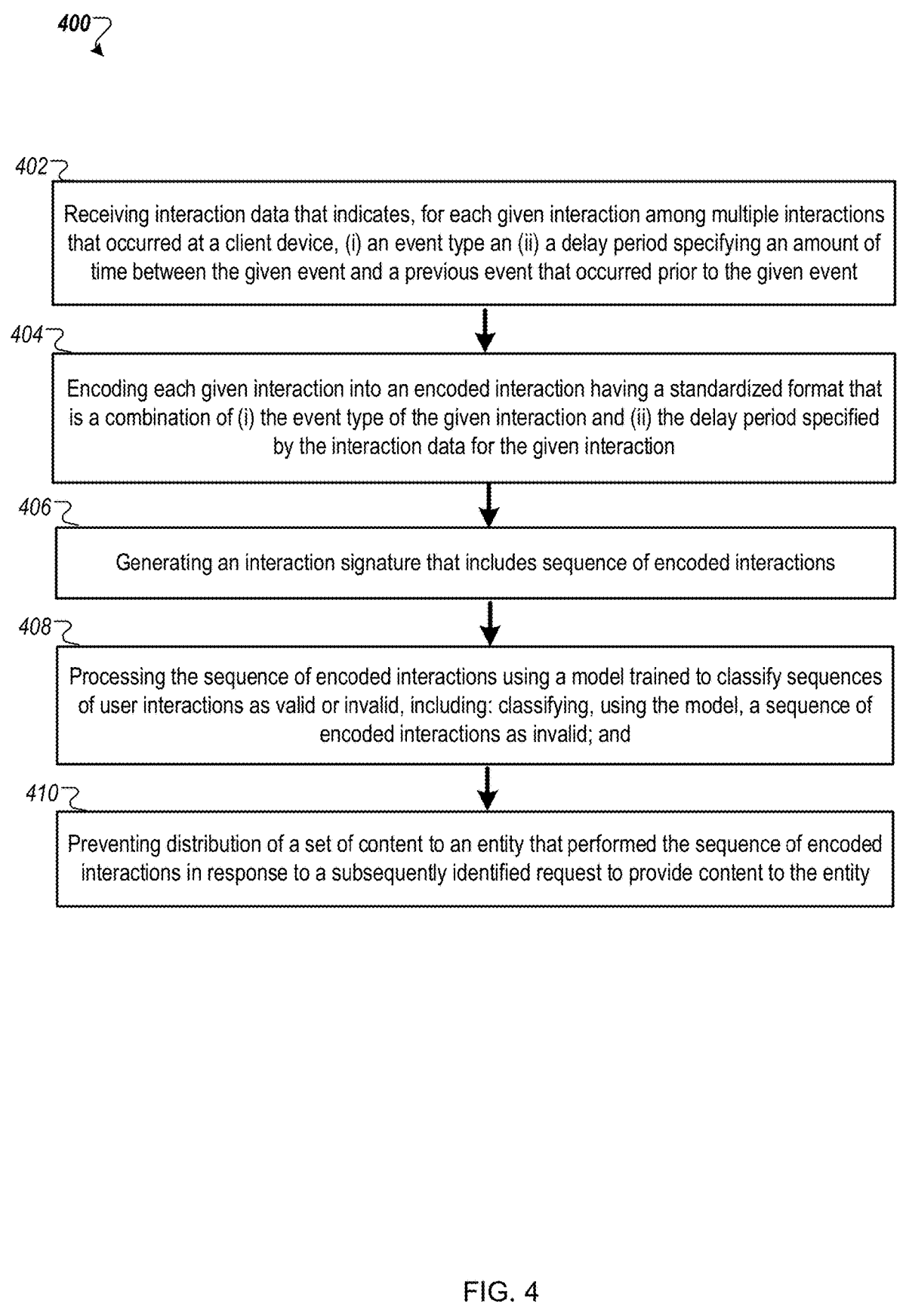

400

402

Receiving interaction data that indicates, for each given interaction among multiple interactions that occurred at a client device, (i) an event type an (ii) a delay period specifying an amount of time between the given event and a previous event that occurred prior to the given event

404

Encoding each given interaction into an encoded interaction having a standardized format that is a combination of (i) the event type of the given interaction and (ii) the delay period specified by the interaction data for the given interaction

406

Generating an interaction signature that includes sequence of encoded interactions

408

Processing the sequence of encoded interactions using a model trained to classify sequences of user interactions as valid or invalid, including: classifying, using the model, a sequence of encoded interactions as invalid; and

410

Preventing distribution of a set of content to an entity that performed the sequence of encoded interactions in response to a subsequently identified request to provide content to the entity

FIG. 4

PATTERN-BASED CLASSIFICATION

CROSS-REFERENCE TO RELATED APPLICATIONS

This application is a continuation application of, and claims priority to, U.S. patent application Ser. No. 18/326,475, titled "PATTERN-BASED CLASSIFICATION," filed on May 31, 2023, which is a continuation application of, and claims priority to, U.S. patent application Ser. No. 16/912,009, now U.S. Pat. No. 11,704,560, titled "PATTERN-BASED CLASSIFICATION," filed on Jun. 25, 2020. The foregoing applications are incorporated herein by reference in their entirety for all purposes.

BACKGROUND

This document relates to data processing and pattern-based classification of sequences of interaction data.

SUMMARY

In general, one innovative aspect of the subject matter described in this specification may be embodied in a method for classifying sequences of interaction data that includes receiving interaction data that indicates, for each given interaction among multiple interactions that occurred at a client device, (i) an event type an (ii) a delay period specifying an amount of time between the given event and a previous event that occurred prior to the given event, encoding each given interaction into an encoded interaction having a standardized format that is a combination of (i) the event type of the given interaction and (ii) the delay period specified by the interaction data for the given interaction, generating an interaction signature that includes a sequence of encoded interactions, processing the sequence of encoded interactions using a model trained to classify sequences of user interactions as valid or invalid, including classifying, using the model, a sequence of encoded interactions as invalid, and preventing distribution of a set of content to an entity that performed the sequence of encoded interactions in response to a subsequently identified request to provide content to the entity.

These and other embodiments may each optionally include one or more of the following features.

In some implementations, the recurrent neural network is a long short term memory (LSTM) network.

In some implementations, preventing distribution of a set of content includes refraining from providing a specified type of content to the entity.

In some implementations, preventing distribution of a set of content includes temporarily preventing distribution of the content to one or more devices corresponding to the entity.

In some implementations, the method includes identifying an outcome entry of a content distribution log corresponding to the sequence of encoded interactions classified as invalid and invalidating the outcome entry corresponding to the sequence of encoded interactions classified as invalid.

In some implementations, invalidating the outcome entry corresponding to the sequence of encoded interactions includes deleting, from memory, the outcome entry.

In some implementations, receiving the interaction data includes collecting, for a given entity, multiple sets of interaction data corresponding to interactions with multiple different portions of content, generating an interaction signature comprises generating a separate interaction signature for each set of the interaction data corresponding to the interactions with each different portion of content, and the method includes classifying the given entity as an actual user or an automated bot based on labels assigned to each set of the interaction data or an aggregate label assigned to the multiple sets of interaction data in aggregate, wherein preventing distribution of the set of content comprises preventing distribution of the set of content when the given entity is classified as the automated bot.

Other embodiments of this aspect may include corresponding systems, apparatus, and computer programs, configured to perform the actions of the methods, encoded on computer storage devices.

Particular embodiments of the subject matter described in this document can be implemented so as to realize one or more of the following advantages. Evaluation and/or classification of online activities can be performed based on a pattern of entity behavior within a sequence of events. Entities include, for example, users, organizations, content providers, content publishers, and companies. In general, online activity classification methods use probabilistic rules to model state transitions, but are linear and limited to analyzing short term effects. For example, existing methods can use a Markov chain-based model to classify sequential information, but Markov chains are typically limited in the number of steps backward that can be accounted for. In addition, Markov chains cannot account for non-linear effects of interactions between links in the chain.

The methods described herein provide an improved activity classification method using both sequential information and contextual information, thereby avoiding shortcomings of existing methods that are not adapted to sequences of varying lengths or having complex interactions within the sequence. In particular, this method uses a model that classifies a particular sequence of activity events related to an entity as either valid or invalid and uses the classification to inform whether or how to adjust the distribution of content to the entity based on the classification. A sequence of activity events can be invalid if, for example, the events were performed by or under the influence of malware or malicious third parties. In another example, a sequence of activity events can be invalid if the behavior is uncharacteristic of the user or type of user, or if the sequence cannot possibly be performed by a human (e.g., the types of interactions performed occurred too quickly for a human to have performed them). By reducing or eliminating entirely the distribution of content to an entity that is identified as performing or being associated with an invalid sequence, the method reduces the amount of resources expended distributing content to an entity that is prone to invalid interactions and more efficiently provide content across a network—the method prevents the distribution of content to an entity that is not actually viewing the content. In other words, the computing resources, such as network bandwidth, processor cycles, and/or allocated memory, are not wasted by using these resources to distribute content to entities that are not actually viewing the content.

Additionally, the methods described can include retroactively invalidating entries within a content distribution log in response a sequence of encoded interactions being labelled as invalid. These invalidated entries can then be deleted from memory, reducing the amount of memory used by a content distribution system.

The described methods can, for example, provide enhanced spam filters that catch ads or view counts from high risk visits; improve traffic quality scores by using prediction scores in aggregate to assess traffic quality; and improve entity risk scores by aggregating the prediction scores at an entity level, and using prediction scores to filter and alter distribution parameters, among other applications.

The described method combines the advantages of models using only event-level features of a sequence of interactions related to an entity and using aggregated features of a sequence of interactions related to an entity. Contextual information is used by inputting interaction data to sequence models using deep neural networks. For simplicity of explanation, the following description is provided with respect to a recurrent neural network (RNN), a deep neural network that is often used in applications such as natural language processing. However, various other types of sequence models using deep neural networks are contemplated, including Transformer neural networks and bidirectional encoder representations from transformers (BERT). By processing behavior of users in visits, or sequences of encoded events, the method allows for contextual information within and among the events in the sequence to inform the classification of the sequence. RNNs in particular provide the flexibility for the method to be used with sequences of varying lengths, and can share features learned across different positions of the sequence, which cannot be obtained using a standard neural network.

The discussion that follows also details several techniques that optimize standard model training techniques for purposes of training a pattern based online activity classification system. As discussed below, these techniques include online activity encoding (e.g., using a standardized format), deep neural networks, and weak supervision to improve the ability to train a model based on patterns of user behavior, alleviating the burden of obtaining hand-labelled data sets and allowing the models to be tailored to specific entities without incurring the cost of having human experts label training data sets for each model.

In addition to improving the quality of the model trained, these techniques also reduce the amount of data to be transmitted across communications channels, for example, by refraining from transmitting a digital component to a client device of an entity if the entity performs invalid sequences. This reduces the amount of resources expended on entities that are not likely to be legitimate consumers of content. Furthermore, the model can be applied to real-time online traffic (e.g., to predict an outcome that will result from transmitting a particular digital component to a particular entity).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow chart of an example process for pattern-based classification of activity.

Like reference numbers and designations in the various drawings indicate like elements.

DETAILED DESCRIPTION

This document describes methods, systems, and devices that improve the classification of activity sequences as valid or invalid, and optimize transmission of digital components to entities based on the classifications.

Pattern based optimization of digital component transmission utilizes patterns of online activity to adjust how digital components are provided to client devices. In some implementations, the evaluation of the online activity requires that the online activities be encoded into a sequence of encoded interaction events that can be used to train a RNN model (e.g., a predictive model or a model that provides post-hoc quality estimates) with weak supervision. Note that much of the discussion that follows refers to predictive analysis, but that the techniques described below are also applicable to post-hoc determinations of quality.

As described in detail below, the model uses a deep neural network and is trained using weak supervision. The model classifies encoded sequences of events as either valid or invalid. The classifications of the model can be used for various purposes, such as adjusting distribution criterion of a digital component based on the classifications of sessions in which the digital component was transmitted to client device, determining whether a particular digital component should be transmitted to a client device in response to submission of a particular query by the client device, and adjusting outcome entries of a log of corresponding to past interactions, among other applications.

Figure 1:
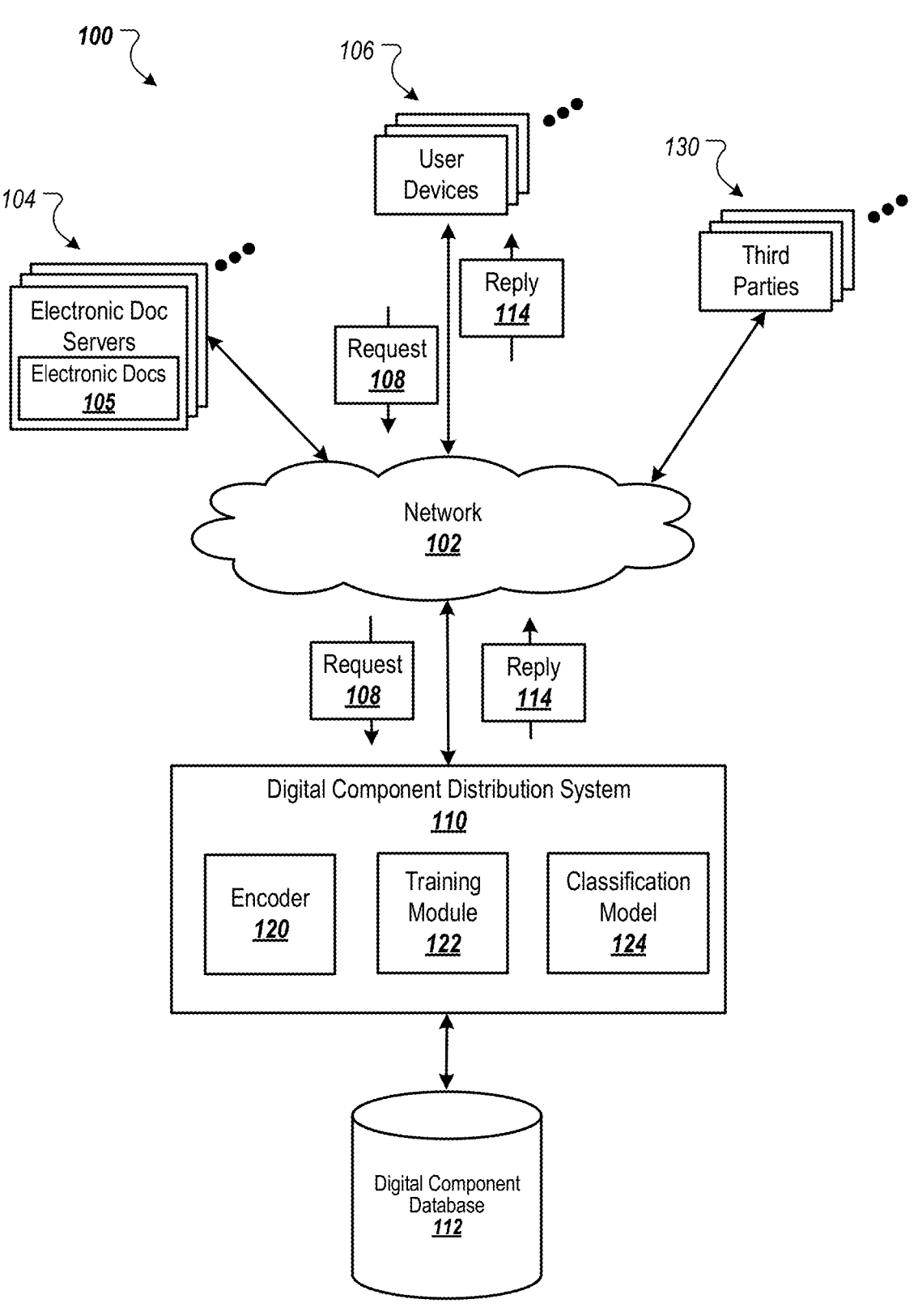
FIG. 1 is a block diagram of an example environment for pattern-based classification of activity.

FIG. 1 is a block diagram of an example environment 100 for efficient, dynamic video editing and rendering. The example environment 100 includes a network 102, such as a local area network (LAN), a wide area network (WAN), the Internet, or a combination thereof. The network 102 connects electronic document servers 104 ("Electronic Doc Servers"), user devices 106, and a digital component distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

One or more third parties 130 include content providers, product designers, product manufacturers, and other parties involved in the design, development, marketing, or distribution of videos, products, and/or services.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

In some implementations, digital components from digital component database 112 can include content provided by third parties 130. For example, digital component database 112 can receive, from a third party 130 that uses machine learning and/or artificial intelligence to navigate public streets, a photo of a public intersection.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Encoder 120 receives interaction or event data and encodes the data into a standardized format. This encoded interaction data is provided to classification model 124. Encoder 130 can receive interaction data from various sources, including user devices 106, third parties 130, and DCDS 110 itself.

Training module 122 trains one or more classification models 116 using machine learning techniques including RNNs and weak supervision to generate training data.

Classification model 124 receives encoded interaction data and outputs a classification of whether a sequence of events represented by the encoded interaction data is valid or invalid.

For ease of explanation, encoder 120, training module 122, and classification model 124 are shown in FIG. 1 as separate components of DCDS 110. DCDS 110 can be implemented as a single system on non-transitory computer-readable media. In some implementations, one or more of encoder 120, training module 122, and classification model 124 can be implemented as integrated components of a single system. DCDS 110, its components encoder 120, training module 122, and classification model 124, and their respective functions and outputs are described in further detail below with reference to pattern-based classification of activity sequences.

Figure 2:
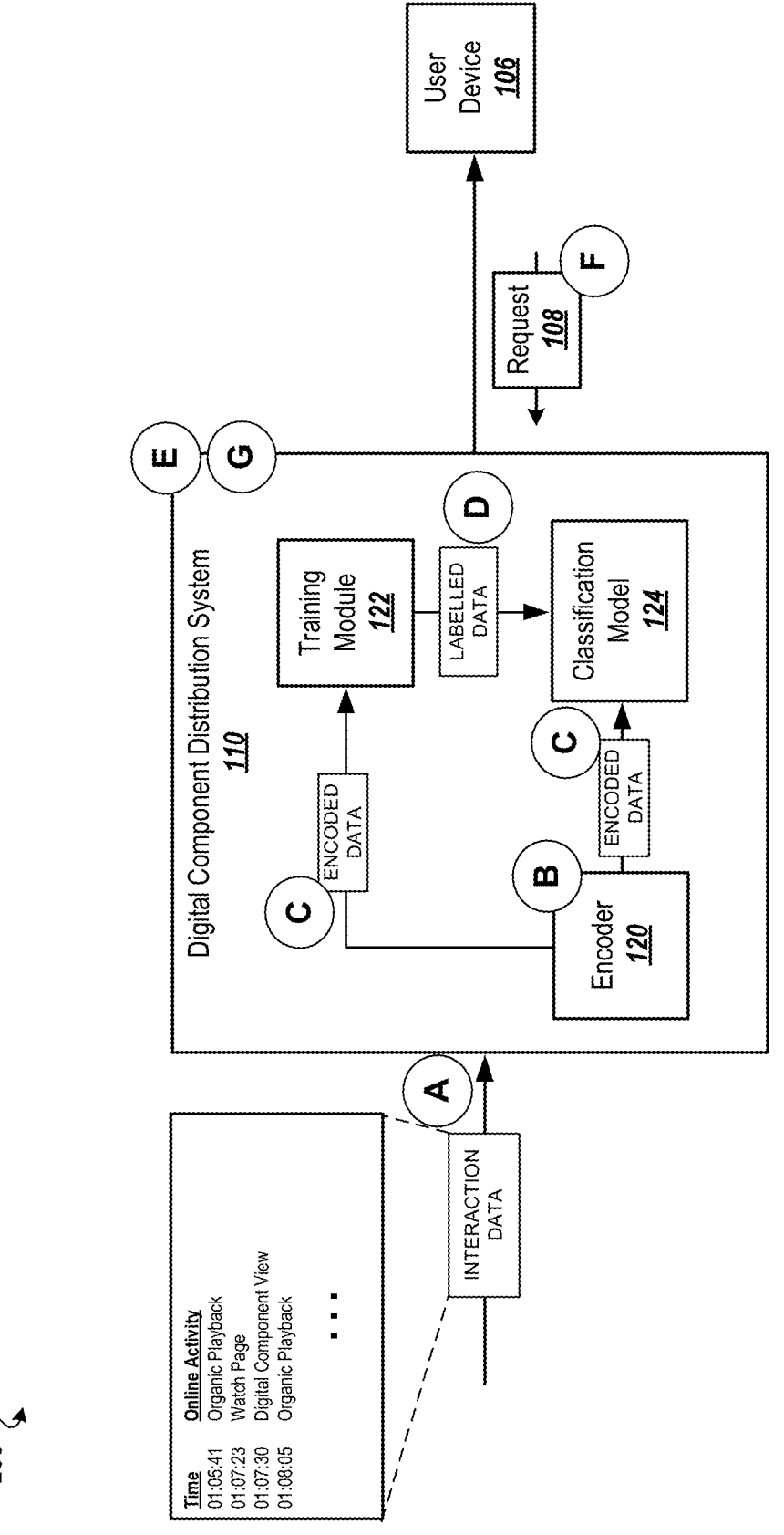
FIG. 2 depicts a data flow of a pattern-based method of classifying activity sequences.

FIG. 2 shows an example data flow 200 of a pattern-based method of classifying activity sequences in the example environment of FIG. 1. Operations of data flow 200 are performed by various components of the system 100. For example, operations of data flow 200 can be performed by encoder 120, training module 122, and classification model 124 of DCDS 110 in communication with user devices 106.

The flow begins with step A, in which encoder 120 receives interaction data. Encoder 120 can receive interaction data from various sources, including user devices 106 and DCDS 110 itself. The interaction data indicates activity performed by a particular entity. For example, a user on a smartphone 106 can click on a video to play the video. In some implementations, the entity can be malware or a malicious third party masquerading as the user of a smartphone 106. Encoder 120 would receive, from the smartphone 106, interaction data that indicates the user's click on the video. The interaction data provides details of the event, including the type of interaction and the time at which the interaction occurred. For example, interaction data can include a timestamp, an event type, and an entity that performed the event. The interaction data can include other features, including data provided by a web browser or by the entity itself. For example, the user may give permission for the smartphone 106 to provide user profile information. In another example, the user's browser or a website that the user is visiting may provide information including IP address, cookie ID, and other browser or cookie related information.

The flow continues with step B, in which encoder 120 encodes the interaction data. Encoder 120 outputs the encoded interaction data in a standardized format. Details of this encoding process are provided below with respect to FIG. 3.

Encoder 120 can encode interaction data into sequences of interactions per visit or session. Visits are sets of interactions made by a single entity. Sessions can be time-limited and/or can be ended based on the occurrence of one or more conditions. For example, sessions can be ended based on the detection of an interaction by the same entity on a different device, the absence of any interactions or activity for a threshold period of time, and the loss of a network connection or change in network status, among other conditions. Sessions can include activities across different browsers or devices. A session may contain multiple visits. For example, the same user might access a website using their smartphone, laptop, or connected TV, each of which would result in a different visit, but might also be part of a same session. Encoder 120 can encode each individual event as a "word" and encode each visit as a sequence of encoded events (e.g., words) to form a "sentence." In the context of the present description, a "word" indicates an encoded interaction, and a "sentence," or sequence of encoded events, indicates an interaction signature. By grouping together the events in sentences, encoder 120 allows classification model 124 to classify data using the relationships between and similarities among events within the same visit.

Additionally, by grouping events by visit, classification model 124 can detect activity performed by different entities within a single session. For example, it is possible for a single user session to be a mixture of both organic visits and malware-driven or hijacked visits. Because events are grouped by visit, classification model 124 can process a hidden browsing window controlled by malware as a different visit with a different classification than other visits performed by a particular user.

In some implementations, encoder 120 includes multiple encoders that each maintain a sequence of events for a particular entity. In some implementations, encoder 120 can maintain multiple, separate threads such that encoder 120 receives interaction data for various entities. Encoder 120 can then encode interaction data into sequences of interactions within the same visit.

The flow continues with step C, in which encoder 120 provides the encoded interaction data to classification model 124 and to training module 122. Encoder 120 outputs the encoded interaction data in a standardized format to classification model 124 and to training module 122. In some implementations, encoder 120 provides the encoded interaction data to classification model 124 word by word, identifying the visit within which each encoded interaction event occurred. In some implementations, encoder 120 provides the encoded interaction data to classification model 124 in sentences.

Training module 122 uses the encoded data to generate training data that is used to train models such as classification model 124. Ground truth training labels may not exist or may be sparse for various examples, such as invalid visits. In some implementations, DCDS 110 uses weak supervision techniques to train models even with limited ground truth training labels. DCDS 110 can use a set of labelling functions created by, for example, human experts; infer a labelling function's accuracy for each label; and then combine a number of labelling function-generated labels into a probabilistic label for each data point to be used as training labels.

Training module 122 can use a pipeline that outputs estimated accuracies for each labelling function based on, for example, votes on particular events. In some implementations, training module 122 groups events into buckets based on the amount of time between the event and a previous event. The buckets may be used to easily distinguish between valid and invalid sequences. Training module 122 may crop, or adjust, the boundaries of the buckets to delineate between valid and invalid sequences. Different types of events can take different amounts of time, and different users can take different amounts of time between events. Training module 122 may adjust the boundaries of the buckets based on time between an event and a previous event, for example, for a particular type of event.

The training labels can be provided as examples instead of ground truth examples to training module 210 as input to train, in this particular example, an RNN-based classification model 124. Classification model 124 is a long short-term memory model (LSTM) and is applicable to sequences of varying lengths. Because classification model 124 is a LSTM model, it can also account for non-linear interactions between events in a visit. Examples can be positive examples or negative examples. Training module 122 can use the training labels to verify model outputs of classification model 124 and continue to train the model to improve the accuracy with which the model classifies sequences of activity events.

Training module 122 performs inferences using inference input data, generating a prediction score for each visit in addition to a classification. The prediction score is semantically a risk score that indicates the probability of the visit being invalid. Training module 122 maintains a log of visits whose risk scores are higher than a threshold. In some implementations, the threshold is selected based on model evaluation statistics available for the classification models at runtime. For example, the threshold can be 90%. In some implementations, the threshold is selected to be the maximum precision available in the evaluation statistics used.

Training module 122 trains classification using a loss function. Loss functions calculate model error, and training module 122 uses the loss function and examples labelled with the training labels to train classification model 124 to learn what variables are important for the model. Training module 122 allows classification model 124 to learn by changing the weights applied to different variables to emphasize or deemphasize the importance of the variable within the model. Changing the weights applied to variables allows classification model 124 to learn which types of information should be more heavily weighted to produce a more accurate classification. Training module 122, for example, uses a loss function that penalizes deviations from labels having a higher confidence level more than deviations from labels having a lower confidence level, giving the model the "benefit of the doubt" for labels having a lower confidence level. Classification model 124 is better able to reconcile noisy data using this method of weak supervision.

In some implementations, training module 122 uses probabilistically labelled data as training data and data that has not yet been labelled as input to classification model 124, such that the data used as input to classification model 124 is not used during model training until after the input data has been classified.

Classification model 124 uses the encoded interaction data as input data and produces a classification of whether the activity represented by the interaction data is valid or invalid.

The flow continues with step D, in which classification model 124 classifies the activity represented by the encoded interaction data as either valid or invalid.

Classification model 124 can be, for example, a "shoe size" model that is individualized to a certain extent. For example, DCDS 110 can use general profiles for people within a particular age bracket, for people in New York, for people who prefer videos to text articles, etc. Additionally, each model can be individualized. For example, each model can be created from a generic model by altering model parameters based on the characteristics for each user determined from the collected data. Each model can vary for a particular user over long periods of time and short periods of time. For example, DCDS 110 can determine a behavioral profile of an entity associated with a particular visit and adjust the classification model based on the behavioral profile of the entity. In some implementations, each model can also be created from a model that has been individualized using a general profile and further altered for each user. For example, a model can be created by altering model parameters based on the characteristics for each user determined from collected data.

In some implementations, models can be individualized without using a base model. For example, user response data can be input to model generator 126 and provided to a product designer, manufacturer, or design program to be mapped to a product configuration with no adjustments. In one example, model generator 126 allows a user to purchase a specific item immediately or to set up alerts when the specific item is available.

The flow continues with step E, in which classification model 124 outputs the determination of whether the activity is valid or invalid to DCDS 110.

Classification model 124 provides the output of whether the activity is valid or invalid to DCDS 110. DCDS 110 uses the classification to adjust the frequency with which content is distributed to an entity that performed the sequence. For example, DCDS 110 can prevent distribution of a set of content to an entity that performed the sequence of encoded interactions in response to a subsequently identified request to provide content to the entity. In some implementations, DCDS 110 can reduce the frequency with which content is distributed to an entity. In some implementations, DCDS 110 can refrain from providing a specified type of content to the entity. For example, DCDS 110 can refrain from providing video content to a user who is not likely to actually watch a video, thereby reducing wasted bandwidth, processor cycles, memory usage, and/or display driver capability by not providing a video that will not actually be watched.

In some implementations, DCDS 110 can refrain from distributing content to devices corresponding to the entity. For example, DCDS 110 can refrain from distributing content to a user's smartphone based on an activity sequence performed on the smartphone that is determined to be performed by malware, but can continue to distribute content to the user's laptop. This type of distribution restriction can reduce wasted computing resources that would otherwise be used to distribute content to the user's smartphone, while still enabling distribution of content to the user's laptop. Restricting distribution of content in this manner prevents the wasted resources, as discussed above, while still enabling content to be provided to a particular type of device at which it is more likely to actually be viewed by the user.

In another example, DCDS 110 can refrain from distributing content to a company's computers at a particular location based on an activity sequence performed on one of the computers at that location that is determined to be invalid. In some implementations, DCDS 110 can conserve memory resources by analyzing outcome entries of a content distribution log, invaliding outcome entries corresponding to activity sequences classified as invalid, and removing the invalidated outcome entries from memory. DCDS 110 frees up resources (e.g., memory) by removing invalid outcome entries and can assist in maintaining accurate records. These records can, for example, be records that are used to maintain a content distribution system and compensate content providers or hosts.

The flow continues with step F, in which DCDS 110 receives, from a user device 106, a request for content that includes entity information. For example, DCDS 110 can receive a request 108 from a user of user device 106.

The flow concludes with step G, in which DCDS 110 determines, based on the determination that an activity sequence associated with the user of user device 106 is invalid, to refrain from distributing content to the user of user device 106. In some implementations, DCDS 110 prevents distribution of a digital component included with the content requested in request 108. In some implementations, DCDS 110 prevents distribution of both a digital component and the content requested in request 108.

Figure 3:
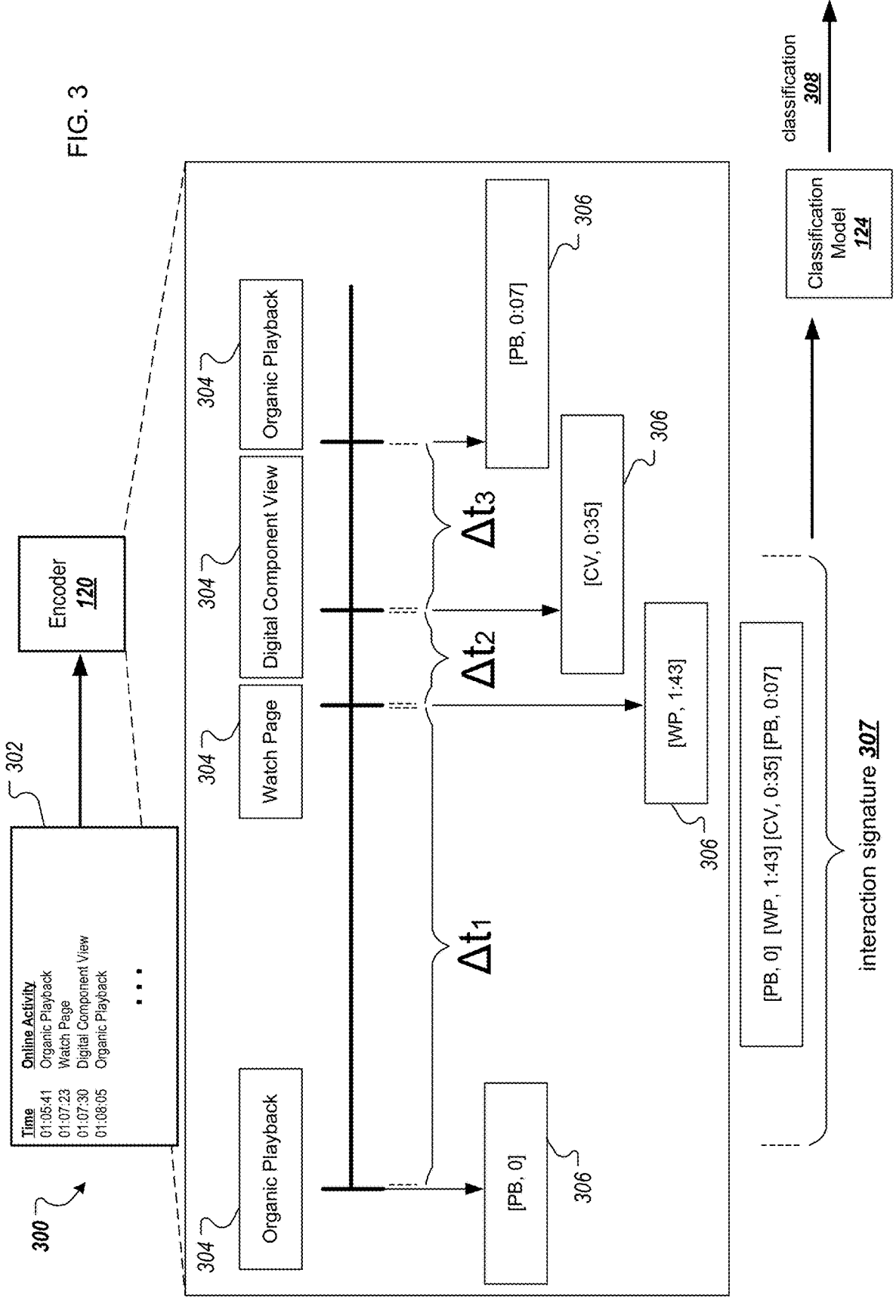
FIG. 3 depicts an encoding process for activity sequences.

FIG. 3 depicts an encoding process 300 for activity sequences. In some implementations, process 300 can be performed by one or more systems. For example, process 300 can be implemented by encoder 120, training module 122, classification model 124, DCDS 110, and/or user device 106 of FIGS. 1-2. In some implementations, the process 300 can be implemented as instructions stored on a non-transitory computer readable medium, and when the instructions are executed by one or more servers, the instructions can cause the one or more servers to perform operations of the process 300.

Encoder 120 receives interaction information 302 associated with an entity. The interaction information can be, for example, the interaction information as described above with respect to FIGS. 1-2. In this particular example, interaction information 302 indicates the time at which an event 304 occurs and an event type of the event 304. Event types can include, for example, a content video playback, a digital component start event, a search, a skippable—or optional—digital component playback, a new visit, a click on a digital component, a non-skippable—or non-optional—digital component playback, engagement with content (such as a like, dislike, or comment, among other types of engagement activity), a new visit starting with a search, a new embedded visit, or a new visit starting with an engagement activity, a click on a search result link, a click on a suggestion, among other event types. For example, a user can perform a search on a search engine and click on a link to be directed to a web page or an application program; these event types can be classified as a click on a search result or launching a new application, respectively.

Each event 304 occurs at a particular time that is indicated by the timestamp for that event 304. Encoder 120 can determine, based on the timestamp of a particular event, a time delay from the previous event in the visit. Encoder 120 assigns the first event in a visit a time delay value of 0.

Encoder 120 formats the information into a standardized format to generate encoded "words" 306. In this particular example, the format is a vector in the form of [event type, time delay]. The format can include other characteristics as described above with respect to FIGS. 1-2. For example, an encoded word 306 generated for an event in which a user begins playback of a cute puppy video on a website 2.4 seconds after the user clicked on the website is encoded as [watch, 2.4]. Encoder 120 can generate a sequence of encoded events, or an interaction signature 307, based on the interaction data. For example, for a sequence of events in which a user clicks on a website, watches a cute puppy video 2.4 seconds later, and then clicks on a link to a different video 2 minutes and 13 seconds later, is encoded as an interaction signature in the form of [navigate, 0][watch, 2.4][watch, 2:13].

In this particular example, encoder 120 generates encoded words 306, which are [PB, 0], [WP, 1:43], [CV, 0:35], [PB, 0:07]. Encoder 120 performs the encoding by mapping the online activity to a short form code and combining the short form code with a calculated time delay. Each event is assigned a timestamp and encoder 120 can, for example, use the timestamp data to calculate a delay period between the particular event and a previous event by calculating the difference between two sequential timestamps for two sequential events corresponding to the particular event and the previous event.

In this particular example, encoder 120 generates interaction signature 307, which is [PB, 0][WP, 1:43][CV, 0:35] [PB, 0:07].

Encoder 120 provides encoded words 306 to classification model 124. Although not shown in FIG. 3, encoder 120 also provides the encoded words 306 to training module 122 as training data to be labelled, as described with respect to FIG. 2. Encoder 120 can provide classification model with individual words or an interaction signature.

Classification model 124 uses encoded words 306 to classify the visit represented by encoded words 306 and outputs a classification 308 of the visit. Classification model 124 classifies a visit as either valid or invalid based on the characteristics and features included in encoded words 306. For example, as described above, classification model 124 can use buckets to delineate between valid and invalid values.

Classification model 124 uses the time delay between events 306 to classify a visit as either valid or invalid. For example, classification model 124 can determine, based on whether a particular time delay could reasonably be performed by a human, is typical of the user or the type of user, or is indicative of actual engagement with the content as opposed to merely clicking through. In one example, a time delay of 0.002 seconds between a video being presented within a news article and a click interaction on the video to begin viewing the video may not be physically possible for a human user to perform, and thus classification model 124 can classify the visit as invalid. In another example, a time delay of 30 seconds between a link to a similarly styled outfit being presented within a page for a particular outfit and a click interaction on the link may be typical of the type of user who visits the fashion advice website, and thus classification model 124 can classify the visit as valid. In another example, a time delay of 1 minute between a 45 second video beginning to play within a social media feed and a scrolling past action may indicate that a human user has actually engaged with the video (e.g., watched a substantive portion of the video) instead of simply scrolling past without watching the video, and thus classification model 124 may classify the visit as valid.

In some implementations, DCDS 110 can receive, for a given entity, multiple sets of interaction data corresponding to interactions with multiple different portions of content. For example, DCDS 110 can receive interaction data for a particular user that corresponds to interactions with multiple types of content from multiple different content providers. Classification model 124 can generate a separate interaction signature for each set of interaction data by classifying the given entity as either an actual user or an automated bot based on labels assigned to each set of the interaction data or an aggregate label assigned to the multiple sets of interaction data in aggregate. For example, classification model 124 can generate a separate interaction signature for each visit associated with a particular user. Classification model 124 can independently classify each visit as either an actual user, or a user who genuinely engages with the content, or an automated bot. Based on the classification of a particular visit by classification model 124, DCDS 110 can prevent distribution of a set of content when the given entity is classified as an automated bot.

FIG. 4 is a flow chart of an example process 400 for efficiently and dynamically altering and rendering video. In some implementations, process 400 can be performed by one or more systems. For example, process 400 can be implemented by encoder 120, training module 122, classification model 124, DCDS 110, and/or user device 106 of FIGS. 1-3. In some implementations, the process 400 can be implemented as instructions stored on a non-transitory computer readable medium, and when the instructions are executed by one or more servers, the instructions can cause the one or more servers to perform operations of the process 400.

Process 400 begins with receiving interaction data that indicates, for each given interaction among multiple interactions that occurred at a client device, (i) an event type an (ii) a delay period specifying an amount of time between the given event and a previous event that occurred prior to the given event (402). For example, DCDS 110 can receive interaction data that indicates, for a set of multiple interactions that occurred at a user device 106 of a user, an event type and timestamp data from which a delay period between the particular event and a previous event for each event in the set can be calculated. Each event is assigned a timestamp and DCDS 110 can use the timestamp data to calculate a delay period between the particular event and a previous event by calculating the difference between two sequential timestamps for two sequential events corresponding to the particular event and the previous event.

In some implementations, receiving the interaction data includes collecting, for a particular entity, multiple sets of interaction data corresponding to interactions with multiple different portions of content. For example, DCDS 110 can collect multiple sets of interaction data for multiple visits for a particular user.

Process 400 continues with encoding each given interaction into an encoded interaction having a standardized format that is a combination of (i) the event type of the given interaction and (ii) the delay period specified by the interaction data for the given interaction (404). For example, encoder 120 can encode each given interaction into an encoded interaction, or word, having a standardized format that includes the event type and the delay period. Encoder 120 performs the encoding by mapping the online activity to a short form code and combining the short form code with a calculated time delay. Encoder 120 can calculate the delay period based on, for example, timestamp data included with the interaction data. Encoder 120 can then generate encoded words 306 that include the event type and delay period for a particular interaction.

Process 400 continues with generating an interaction signature that includes a sequence of encoded interactions (406). For example, encoder 120 can generate an interaction signature, or a sentence, of encoded interactions. In some implementations, encoder 120 can generate the interaction signature before encoding the words by aggregating interaction data for a set of events that are part of a single visit for a particular user. In some implementations, encoder 120 can generate the interaction signature after encoding the words by aggregating the encoded interactions for a set of events that are part of a single visit for a particular user.

In some implementations, generating an interaction signature includes generating a separate interaction signature for each set of the interaction data corresponding to the interactions with each different portion of content. For example, generating an interaction signature can include generating a separate interaction signature for each visit in a set of visits.

Process 400 continues with processing the sequence of encoded interactions using a model trained to classify sequences of user interactions as valid or invalid, including classifying, using the model, a sequence of encoded interactions as invalid (408). For example, classification model 124 can process the sequence of encoded interactions using a model, such as classification model 124, that is trained to classify sequences of user interactions as valid or invalid. Classification model 124 can classify, for example, an activity sequence represented by a sentence of encoded words as a valid activity sequence or an invalid activity sequence. In this particular example, classification model 124 can classify an activity sequence as an invalid activity sequence because the sequence indicates, for example, that the activity sequence was performed under the influence of malware, hijacking, or a disinterested user who did not actually engage with the content.

In some implementations, classifying the given entity as an actual user or an automated bot is based on labels assigned to each set of the interaction data or an aggregate label assigned to the multiple sets of interaction data in aggregate. For example, classification model 124 can classify a particular entity as an actual user or a bot based on classifications of each of a set of visits or an aggregate classification assigned to the sets.

Process 400 concludes with preventing distribution of a set of content to an entity that performed the sequence of encoded interactions in response to a subsequently identified request to provide content to the entity (410). For example, DCDS 110 can prevent distribution of a set of content to the entity that performed the sequence of encoded interactions upon determining that the sequence is invalid in response to receiving a request for content.

In some implementations, preventing distribution of a set of content includes refraining from providing a specified type of content to the entity. For example, DCDS 110 can refrain from providing text content to a user who is not likely to actually watch read an article, thereby reducing wasted bandwidth, processor cycles, memory usage, and/or display driver capability by not providing content that will not actually be read.

In some implementations, DCDS 110 can refrain from distributing content to devices corresponding to the entity. For example, DCDS 110 can refrain from distributing content to a user's laptop based on an activity sequence performed on the laptop that is determined to be performed by a malicious third party, but can continue to distribute content to the user's smartphone. In some implementations, DCDS 110 can generate an alert indicating this activity to the user. This type of distribution restriction can reduce wasted computing resources that would otherwise be used to distribute content to the user's smartphone, while still enabling distribution of content to the user's laptop. Restricting distribution of content in this manner prevents the wasted resources, as discussed above, while still enabling content to be provided to a particular type of device at which it is more likely to actually be viewed by the user.

In some implementations, preventing distribution of the set of content includes preventing distribution of the set of content when the given entity is classified as an automated bot. For example, DCDS 110 can prevents distribution of a set of content when the entity identified in the request is classified as an automated bot.

In some implementations, process 400 can continue by identifying an outcome entry of a content distribution log corresponding to the sequence of encoded interactions classified as invalid and then invalidating the outcome entry corresponding to the sequence of encoded interactions classified as invalid. For example, DCDS 110 can identify, within a content distribution log, a particular outcome entry (indicating, for example, whether a particular interaction was successfully completed or satisfied a set of conditions) corresponding to the interaction signature classified as invalid. DCDS 110 can then invalidate the outcome entry within the log. In some implementations, DCDS 110 can remove the invalidated entry, freeing up resources, such as memory.

Figure 5:
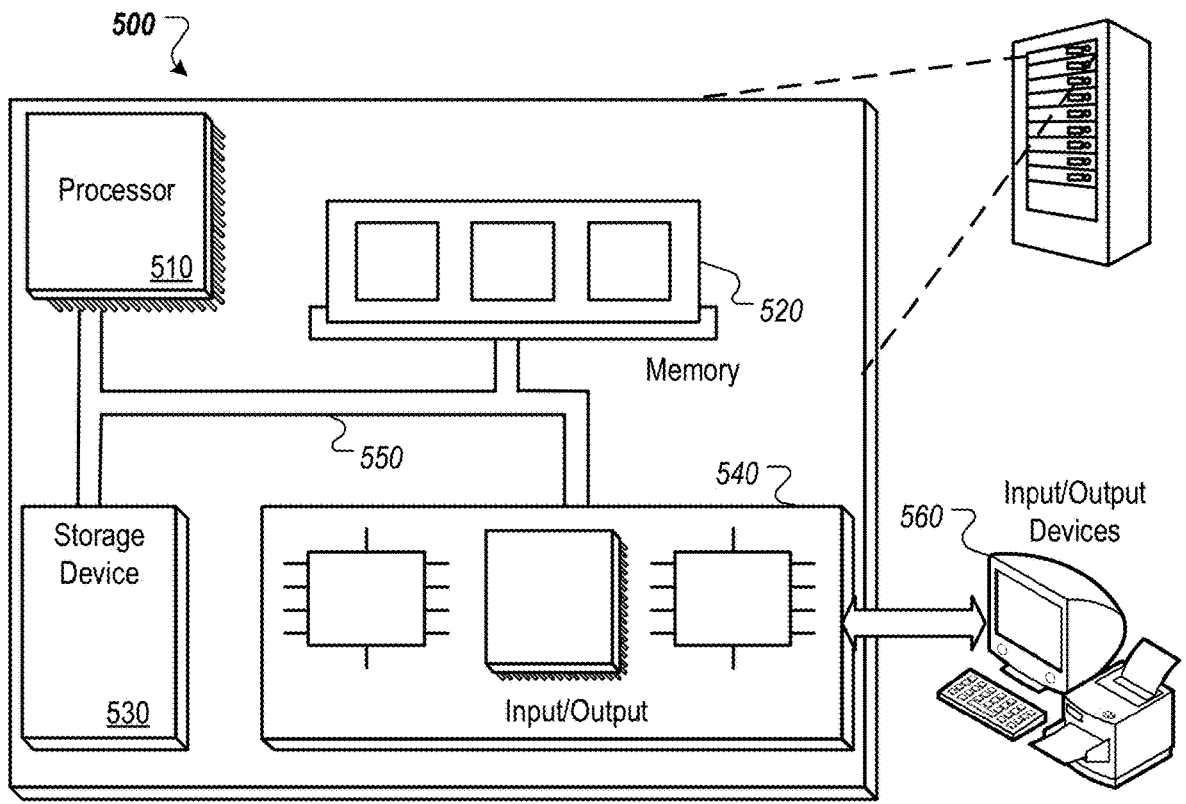
FIG. 5 is a block diagram of an example computing system.

FIG. 5 is block diagram of an example computer system 500 that can be used to perform operations described above. The system 400 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:

receiving interaction data for a sequence of user interactions with one or more electronic documents performed by an entity at a client device;

encoding the interaction data for the sequence of user interactions into encoded interaction data having a standardized format that is based on (i) an event type of each user interaction in the sequence of user interactions and (ii) a calculated time period indicating a duration of time elapsed between each of one or more user interactions in the sequence of user interactions and an immediately preceding user interaction in the sequence of user interactions;

providing the encoded interaction data for the sequence of user interactions to a trained machine learning model that is trained to classify sequences of user interactions as valid or invalid;

receiving, as an output of the trained machine learning model, a classification of the sequence of user interactions; and controlling distribution of content to the entity based on the classification of the sequence of user interactions.

2. The method of claim 1, wherein controlling distribution of content to the entity based on the classification of the sequence of user interactions comprises distributing content to the entity in response to the classification of the sequence of user interactions being valid.

3. The method of claim 1, wherein controlling distribution of content to the entity based on the classification of the sequence of user interactions comprises reducing an amount of content distributed to the entity in response to the classification of the sequence of user interactions being invalid.

4. The method of claim 1, wherein controlling distribution of content to the entity based on the classification of the sequence of user interactions comprises adjusting distribution criteria for a digital component based on at least on the classification of the sequence of user interactions.

5. The method of claim 4, wherein adjusting the distribution criteria for the digital component comprises adjusting the distribution criteria based on classifications for multiple entities.

6. The method of claim 1, wherein the classification of the sequence of user interactions comprises a classification as an actual user or a classification as an automated bot.

7. The method of claim 1, wherein controlling distribution of content to the entity based on the classification of the sequence of user interactions comprises refraining for providing a specific type of content to the entity.

8. The method of claim 1, wherein encoding the interaction data for the sequence of user interactions into encoded interaction data having a standardized format comprises generating an interaction signature for the sequence of user interactions.

9. The method of claim 1, wherein encoding the interaction data for the sequence of user interactions into encoded interaction data having a standardized format comprises generating an interaction signature for each visit to a resource, wherein each interaction signature includes a portion of the sequence of user interactions.

10. The method of claim 1, wherein encoding the interaction data for the sequence of user interactions into encoded interaction data having a standardized format comprises generating an interaction signature for each user session of with a resource, wherein each interaction signature includes a portion of the sequence of user interactions.

11. A system comprising:

one or more processors; and one or more memory elements including instructions that, when executed, cause the one or more processors to perform operations comprising:

receiving interaction data for a sequence of user interactions with one or more electronic documents performed by an entity at a client device;

encoding the interaction data for the sequence of user interactions into encoded interaction data having a standardized format that is based on (i) an event type of each user interaction in the sequence of user interactions and (ii) a calculated time period indicating a duration of time elapsed between each of one or more user interactions in the sequence of user interactions and an immediately preceding user interaction in the sequence of user interactions;

providing the encoded interaction data for the sequence of user interactions to a trained machine learning model that is trained to classify sequences of user interactions as valid or invalid;

receiving, as an output of the trained machine learning model, a classification of the sequence of user interactions; and controlling distribution of content to the entity based on the classification of the sequence of user interactions.

12. The system of claim 11, wherein controlling distribution of content to the entity based on the classification of the sequence of user interactions comprises distributing content to the entity in response to the classification of the sequence of user interactions being valid.

13. The system of claim 11, wherein controlling distribution of content to the entity based on the classification of the sequence of user interactions comprises reducing an amount of content distributed to the entity in response to the classification of the sequence of user interactions being invalid.

14. The system of claim 11, wherein controlling distribution of content to the entity based on the classification of the sequence of user interactions comprises adjusting distribution criteria for a digital component based on at least on the classification of the sequence of user interactions.

15. The system of claim 14, wherein adjusting the distribution criteria for the digital component comprises adjusting the distribution criteria based on classifications for multiple entities.

16. The system of claim 11, wherein the classification of the sequence of user interactions comprises a classification as an actual user or a classification as an automated bot.

17. The system of claim 11, wherein controlling distribution of content to the entity based on the classification of the sequence of user interactions comprises refraining for providing a specific type of content to the entity.

18. A non-transitory computer storage medium encoded with instructions that when executed by a computing system cause the computing system to perform operations comprising:

receiving interaction data for a sequence of user interactions with one or more electronic documents performed by an entity at a client device;

encoding the interaction data for the sequence of user interactions into encoded interaction data having a standardized format that is based on (i) an event type of each user interaction in the sequence of user interactions and (ii) a calculated time period indicating a duration of time elapsed between each of one or more user interactions in the sequence of user interactions and an immediately preceding user interaction in the sequence of user interactions;

providing the encoded interaction data for the sequence of user interactions to a trained machine learning model that is trained to classify sequences of user interactions as valid or invalid;

receiving, as an output of the trained machine learning model, a classification of the sequence of user interactions; and controlling distribution of content to the entity based on the classification of the sequence of user interactions.

19. The non-transitory computer storage medium of claim 18, wherein controlling distribution of content to the entity based on the classification of the sequence of user interactions comprises distributing content to the entity in response to the classification of the sequence of user interactions being valid.

20. The non-transitory computer storage medium of claim 18, wherein controlling distribution of content to the entity based on the classification of the sequence of user interactions comprises reducing an amount of content distributed to the entity in response to the classification of the sequence of user interactions being invalid.

\*  \*  \*  \*  \*